(12) United States Patent
Walsh et al.

(10) Patent No.: US 11,511,971 B2
(45) Date of Patent: Nov. 29, 2022

(54) ADJUSTABLE LENGTH LIFTING BRACKET

(71) Applicant: Caterpillar Inc., Peoria, IL (US)

(72) Inventors: Matthew Wayne Walsh, Congerville, IL (US); Gabriel J. Ellicott, Peoria Heights, IL (US); Brett E. Burke, Minier, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/217,790

(22) Filed: Mar. 30, 2021

(65) Prior Publication Data

US 2022/0315389 A1     Oct. 6, 2022

(51) Int. Cl.
*B66C 1/66* (2006.01)
*F16G 15/08* (2006.01)

(52) U.S. Cl.
CPC ............... *B66C 1/66* (2013.01); *F16G 15/08* (2013.01)

(58) Field of Classification Search
CPC .................................. B66C 1/66; F16G 15/08
USPC ........................................................ 294/215
See application file for complete search history.

(56) References Cited

U.S. PATENT DOCUMENTS

| | | | | |
|---|---|---|---|---|
| 5,772,252 A | * | 6/1998 | Malani .................. | F16L 25/065 411/389 |
| 5,848,815 A | * | 12/1998 | Tsui ........................ | B66C 1/66 294/215 |
| 6,068,310 A | * | 5/2000 | Fuller ...................... | B66C 1/66 294/215 |
| 6,161,884 A | * | 12/2000 | Pearl ........................ | B66C 1/66 294/215 |
| 6,199,925 B1 | | 3/2001 | Alba | |
| 6,578,889 B2 | * | 6/2003 | Pearl ........................ | B66C 1/66 294/215 |
| 7,114,872 B2 | * | 10/2006 | Alba ........................ | B66C 1/66 294/215 |
| 8,201,867 B2 | | 6/2012 | Thomeczek | |
| D835,494 S | * | 12/2018 | Loechel .................. | D8/356 |
| 10,242,306 B1 | | 3/2019 | Hong | |
| 2004/0032134 A1 | * | 2/2004 | Hageman ................ | B66C 1/66 294/215 |
| 2005/0017522 A1 | * | 1/2005 | Smetz ...................... | B66C 1/66 294/215 |
| 2010/0207406 A1 | * | 8/2010 | Thomeczek ............ | B66C 1/66 294/215 |

FOREIGN PATENT DOCUMENTS

EP            2851327 A1       3/2015

OTHER PUBLICATIONS

"Yellow Point (YP)," Yoke, 2020, 3 pages. [Retrieved from: https://usriggingyokedistributor.com/yellow-point-yp/].

(Continued)

*Primary Examiner* — Paul T Chin
(74) *Attorney, Agent, or Firm* — Harrity & Harrity LLP; James S. Bennin

(57) ABSTRACT

A lifting system may comprise a rod comprising a threaded portion and a lifting bracket assembly configured to be moved up and down the threaded portion. The lifting bracket assembly may comprise a bushing component, a lifting bracket comprising a receiving portion that includes a receiving hole, and a threaded component configured to be inserted over the bushing component. The receiving portion may be configured to be inserted over the bushing component via the receiving hole.

18 Claims, 5 Drawing Sheets

(56) References Cited

OTHER PUBLICATIONS

"Yellow Point," Yoke, 2020, 66 pages. [Retrieved from: https://www.yoke.net/Pic/DocFiles/DRSVRG9LDY0Z0051(1).pdf].
"Hoist Rings," TE-CO Workholding, 2020, 2 pages. [Retrieved from: https://catalog.te-co.com/category/hoist-rings1].
"Hoist Rings / Lifting Points," American Drill Bushing, 5 pages. [Retrieved from: http://americandrillbushing.com/products-services/hoist-ringslifting-points/ on Mar. 30, 2021].
Hoist Rings & Lifting Products, Jergens, 2 pages. [Retrieved from: https://www.jergensinc.com/Hoist-Rings-Lifting-Products on Mar. 30, 2021].
The Lifting Point Family, Gunnebo, 14 pages. [Retrieved from: https://www.gunneboindustries.com/Global/Lifting/Catalogues/English/Chapter%203%20-%20Lifting%20Points%202019.pdf on Mar. 30, 2021]].

\* cited by examiner

ADJUSTABLE LENGTH LIFTING BRACKET

TECHNICAL FIELD

The present disclosure relates generally to a lifting device and, for example, to an adjustable length lifting bracket.

BACKGROUND

A single point lifting device (also referred to as a lifting eye, a lifting link, a lifting link bracket, or a lifting bracket) may be used to attach to (e.g., may be secured to) a component that is to be lifted. The single point lifting device may include a hole that receives a fastener. The fastener (in addition to being received through the hole of the lifting device) may be received in a hole in the component so as to secure the lifting device to the component. The single point lifting device may be lifted (e.g., via a chain attached to the lifting device) and, thereby, cause the component (secured to the lifting device) to be lifted.

There are currently a large number of single point lifting devices on the market. Manufacturers of single point lifting devices typically sell multiple variations of a same single point lifting device. The variations (for the same single point lifting device) may be created for different fastener lengths, for different hole depths (of holes of components to be lifted), and/or for different through-hole applications. As a result of the variations, a technician may be required to carry an excessive number of single point lifting devices in order to perform different types of lifting tasks.

Additionally, the variations may cause some confusion to the technician with respect to an appropriate fastener to use for a particular variation of a single point lifting device. As a result of the confusion, the technician may select and use an incorrect fastener for the particular variation of the single point lifting device. Using an incorrect fastener may result in improper usage of the single point lifting device, may cause the single point lifting device to be improperly secured to a component to be lifted, may cause damage to the component being lifted, may cause damage to the single point lifting device, among other examples.

U.S. Pat. No. 8,201,867 (the '867 patent) discloses an omni-positional hoist ring assembly including a bushing element that includes a sleeve with an axial length, a proximal end and a distal end. The '867 patent also discloses that the sleeve has an internal thread extending at least part way of the axial length of the sleeve. The '867 patent also discloses that a mounting screw element has a major axis, a head, and a shank disposed generally co-axially around the major axis. However, the '867 patent does not disclose that the omni-positional hoist ring assembly may be adjusted for use for different fastener lengths, for different hole depths (of holes of components to be lifted), and/or for different through-hole applications.

The adjustable length lifting bracket of the present disclosure solves one or more of the problems set forth above and/or other problems in the art.

SUMMARY

In some implementations, an adjustable length lifting bracket assembly includes a threaded rod; a bushing configured to be inserted over the threaded rod; a lifting bracket comprising a receiving portion that includes a receiving hole, wherein the receiving portion is configured to be inserted over the bushing via the receiving hole; and an adjusting nut comprising an internal surface that comprises a threaded portion and a non-threaded portion, wherein the threaded portion is configured to be threaded onto the threaded rod and the non-threaded portion is configured to be inserted over the bushing, and wherein the adjusting nut is configured to be threaded up and down the threaded rod, with the bushing, to adjust a position of the lifting bracket on the threaded rod.

In some implementations, a lifting component includes a rod comprising a threaded portion; a bushing configured to be inserted onto the threaded portion; a lifting bracket comprising a receiving portion that includes a receiving hole, wherein the receiving portion is configured to be inserted over the bushing, via the receiving hole; and an adjusting nut, wherein the adjusting nut is configured to be threaded onto the threaded portion and is configured to be provided over a portion of the bushing, and wherein the adjusting nut is configured to be threaded up and down the threaded portion, with the bushing, to adjust a position of the lifting bracket on the rod.

In some implementations, a lifting system comprising: a rod comprising a threaded portion; and a lifting bracket assembly configured to be moved up and down the threaded portion, wherein the lifting bracket assembly comprises: a bushing component, a lifting bracket comprising a receiving portion that includes a receiving hole, wherein the receiving portion is configured to be inserted over the bushing component via the receiving hole, and a threaded component configured to be inserted over the bushing component.

DETAILED DESCRIPTION

The present disclosure is directed to an adjustable length lifting bracket. In some implementations, the adjustable length lifting bracket comprises a threaded rod, a bushing, a lifting bracket, a washer, an adjusting nut (e.g., a modified hexagonal nut), and an installation nut. The bushing is inserted into a receiving hole of the lifting bracket. A washer is then assembled onto the bushing, on top of the lifting bracket. The adjusting nut is then press-fit assembled onto the bushing. The lifting bracket is secured (e.g., permanently secured) by a combination of the bushing, the washer, and the adjusting nut. The lifting bracket, the bushing, the washer, and the adjusting nut may form a lifting bracket assembly. The lifting bracket assembly is threaded onto the threaded rod via the adjusting nut. Finally, the installation nut is threaded and secured (e.g., permanently secured) to a top portion of the threaded rod. In this regard, the lifting bracket is configured to not be removed from the threaded rod.

The combination of the bushing and the adjusting nut enables a position of the lifting bracket to be adjusted on the threaded rod in order to mount the lifting bracket assembly flush to a surface of a component that is being lifted. A length of the threaded rod (e.g., an extended length of the threaded rod) enables the lifting bracket to be used in a wide variety of applications (e.g., standard depth threaded holes, deeply counterbored holes, unthreaded through-holes of various thicknesses, among other examples). For example, adjusting the position of the lifting bracket assembly causes the length of the threaded rod to be adjusted for use in the applications mentioned above. Additionally, the adjustable length lifting bracket, as described herein, saves resources (e.g., computing resources, energy resources, material resources, networking resources, among other examples) that would be needed to produce and use various non-adjustable length lifting brackets for different types of applications.

Figure 1:
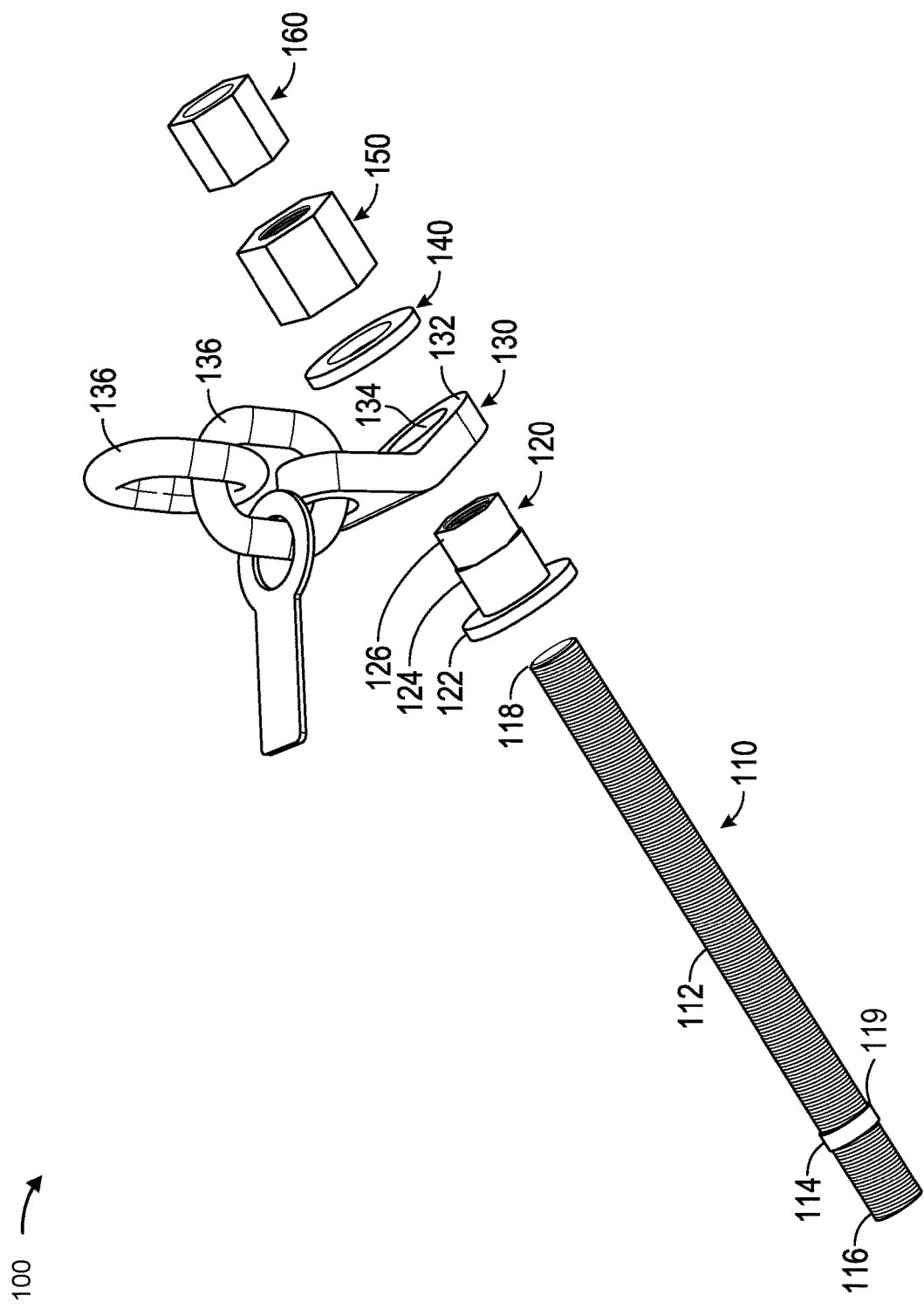
FIG. 1 is a diagram of an exploded view of an example adjustable length lifting bracket described herein.

FIG. 1 is a diagram of an exploded view of an example adjustable length lifting bracket 100 described herein. As shown in FIG. 1, adjustable length lifting bracket 100 may include a rod 110, a bushing component 120, a lifting bracket 130, a washer 140, a first threaded component 150, and a second threaded component 160. In some implementations, one or more of rod 110, bushing component 120, lifting bracket 130, washer 140, first threaded component 150, or second threaded component 160 may comprise a metal such as titanium, aluminum, steel, brass, bronze, among other examples.

Rod 110 may be a threaded rod that includes a first threaded portion 112, a non-threaded portion 114 (or modified portion), and a second threaded portion 116. First threaded portion 112 comprises a first end 118 and a second end 119 opposite the first end 118. As explained in more detail below, bushing component 120, lifting bracket 130, washer 140, first threaded component 150, and second threaded component 160 may be configured to be threaded onto first threaded portion 112, with second threaded component 160 being configured to be threaded adjacent to first end 118 of first threaded portion 112.

As shown in FIG. 1, non-threaded portion 114 may be provided between first threaded portion 112 and second threaded portion 116. Non-threaded portion 114 may be configured to prevent movement of bushing component 120, lifting bracket 130, washer 140, and first threaded component 150 past second end 119 of first threaded portion 112. As shown in FIG. 1, non-threaded portion 114 may be larger in diameter than rod 110. Alternatively, non-threaded portion 114 may be altered (e.g., peened, crimped, among other examples). For example, non-threaded portion 114 may be configured to prevent movement of bushing component 120, lifting bracket 130, washer 140, and first threaded component 150 along second threaded portion 116. Second threaded portion 116 may be configured to be inserted into a hole of a component that is to be lifted (e.g., lifted using adjustable length lifting bracket 100).

Bushing component 120 may include a flanged portion 122, a bushing portion 124, and an interlocking nut portion 126. Flange portion 122 extends radially from bushing portion 124. Flange portion 122 may prevent movement of lifting bracket 130 below bushing component 120, after lifting bracket 130 is inserted over bushing portion 124. As shown in FIG. 1, a shape of interlocking nut portion 126 of bushing component 120 is a circular shape. Alternatively, the shape of interlocking nut portion 126 may be a square shape, a hexagonal shape, among other examples. As shown in FIG. 1, bushing component 120 is illustrated as a bushing. Alternatively, bushing component 120 may be a nut (e.g., an adjusting nut that facilitates an adjustment of a position of lifting bracket 130 on rod 110) or another type of mechanical fastener or hardware.

Lifting bracket 130 may include a receiving portion 132, a receiving hole 134, and links 136. Receiving portion 132 may be configured to be inserted over bushing portion 124, of bushing component 120, via receiving hole 134. A bottom surface of receiving portion 132 may be provided above a top surface of flanged portion 122 of bushing component 120 when receiving portion 132 is inserted over bushing portion 124. In some implementations, another element (e.g., a washer) may be inserted between the bottom surface of receiving portion 132 and the top surface of flanged portion 122 of bushing component 120. Links 136 may be configured to receive one or more chains (or cables or ropes). In this regard, lifting bracket 130 may be lifted via the one or more chains and, thereby, cause a component (secured to lifting bracket 130) to be lifted. Lifting bracket 130 and the number of links 136 are merely provided as an example. Other examples of lifting devices with no links or different numbers of links may be applicable to the present disclosure.

Washer 140 may be configured to be inserted over bushing portion 124. Washer 140 may be provided between a top surface of receiving portion 132 of lifting bracket 130 and a bottom surface of first threaded component 150. First threaded component 150 may be configured to be threaded onto first threaded portion 112 of rod 110 and configured to be inserted over interlocking nut portion 126 of bushing component 120. As shown in FIG. 1, first threaded component 150 is illustrated as a nut (e.g., an adjusting nut that facilitates the adjustment of the position of lifting bracket 130 on rod 110) with a hexagonal shape. Alternatively, first threaded component 150 may be another type of mechanical fastener and a shape of first threaded component 150 may be a square shape, a circular shape, among other examples.

A shape of a portion of an internal surface of first threaded component 150 may match a shape of an external surface of bushing component 120 (e.g., match the shape of the interlocking nut portion 126 of bushing component 120), as discussed in more detail below in connection with FIG. 3. In this regard, when such portion (of the internal surface of first threaded component 150) is inserted over interlocking nut portion 126 of bushing component 120, a movement (e.g., a threading movement) of first threaded component 150 (e.g., up or down rod 110) may cause a corresponding movement (e.g., a corresponding threading movement) of bushing component 120, thereby causing the adjustment of the position of lifting bracket 130 on rod 110.

Second threaded component 160 may be configured to be threaded onto first threaded portion 112 of rod 110. As shown in FIG. 1, second threaded component 160 is illustrated as a nut (e.g., a locking nut) with a hexagonal shape. Alternatively, second threaded component 160 may be another type of mechanical fastener and a shape of second threaded component 160 may be a square shape, a circular shape, among other examples.

In some implementations, bushing component 120, lifting bracket 130, washer 140, and first threaded component 150 may be assembled to form a lifting bracket assembly. For example, lifting bracket 130 may be inserted over bushing component 120 (as explained above), washer 140 may be provided over lifting bracket 130 (as explained above), and first threaded component 150 inserted over bushing component 120 (as explained above). The lifting bracket assembly may be threaded onto rod 110 (e.g., from first threaded portion 112). Second threaded component 160 may be threaded onto rod 110 (e.g., from first threaded portion 112) after the lifting bracket assembly has been threaded onto rod 110.

In some implementations, second threaded component 160 may be permanently threaded onto rod 110 (e.g., a fixed nut permanently threaded onto rod 110) to be prevent the lifting bracket assembly from being removed from rod 110.

The lifting bracket assembly may be configured to be threaded up and down first threaded portion 112 of rod 110 based on movement of first threaded component 150 (e.g., threading movement up and down rod 110). Movement of first threaded component 150 may be caused by a tool such as a wrench, a ratchet, a socket, a pair of pliers, among other examples. Additionally, or alternatively, movement of first threaded component 150 may be caused by fingers of an individual. First threaded component 150 may be configured to be threaded up and down rod 110 to cause the lifting bracket assembly to be threaded up and down rod 110 in a corresponding manner, thereby adjusting the position of lifting bracket 130, on rod 110, between first end 118 and second end 119 of first threaded portion 112.

Adjusting the position of lifting bracket 130 may cause a length of rod 110 to be adjusted for use in different applications. For example, the length of rod 110 may be adjusted to enable lifting bracket 130 to be used in a wide variety of applications (e.g., standard depth threaded holes, deeply counterbored holes, unthreaded through-holes of various thicknesses, among other examples). For instance, the position of lifting bracket 130 may be adjusted to a first position when second threaded portion 116 of rod 110 is inserted (or threaded) into a standard depth threaded hole, the position of lifting bracket 130 may be adjusted to a second position when second threaded portion 116 of rod 110 is inserted (or threaded) into a deeply counterbored hole, and so on.

In other words, the position of lifting bracket 130 may be adjusted, based on a hole (e.g., based on a depth of the hole), to cause the length of rod 110 to be adjusted for the hole (e.g., for the depth of the hole). Additionally, the position of lifting bracket 130 may be adjusted on rod 110 (after second threaded portion 116 has been inserted into a component to be lifted) in order to mount lifting bracket 130 flush (or substantially flush) to a surface of the component, thereby properly securing lifting bracket 130 to the component.

As indicated above, FIG. 1 is provided as an example. Other examples may differ from what was described in connection with FIG. 1.

Figure 2:
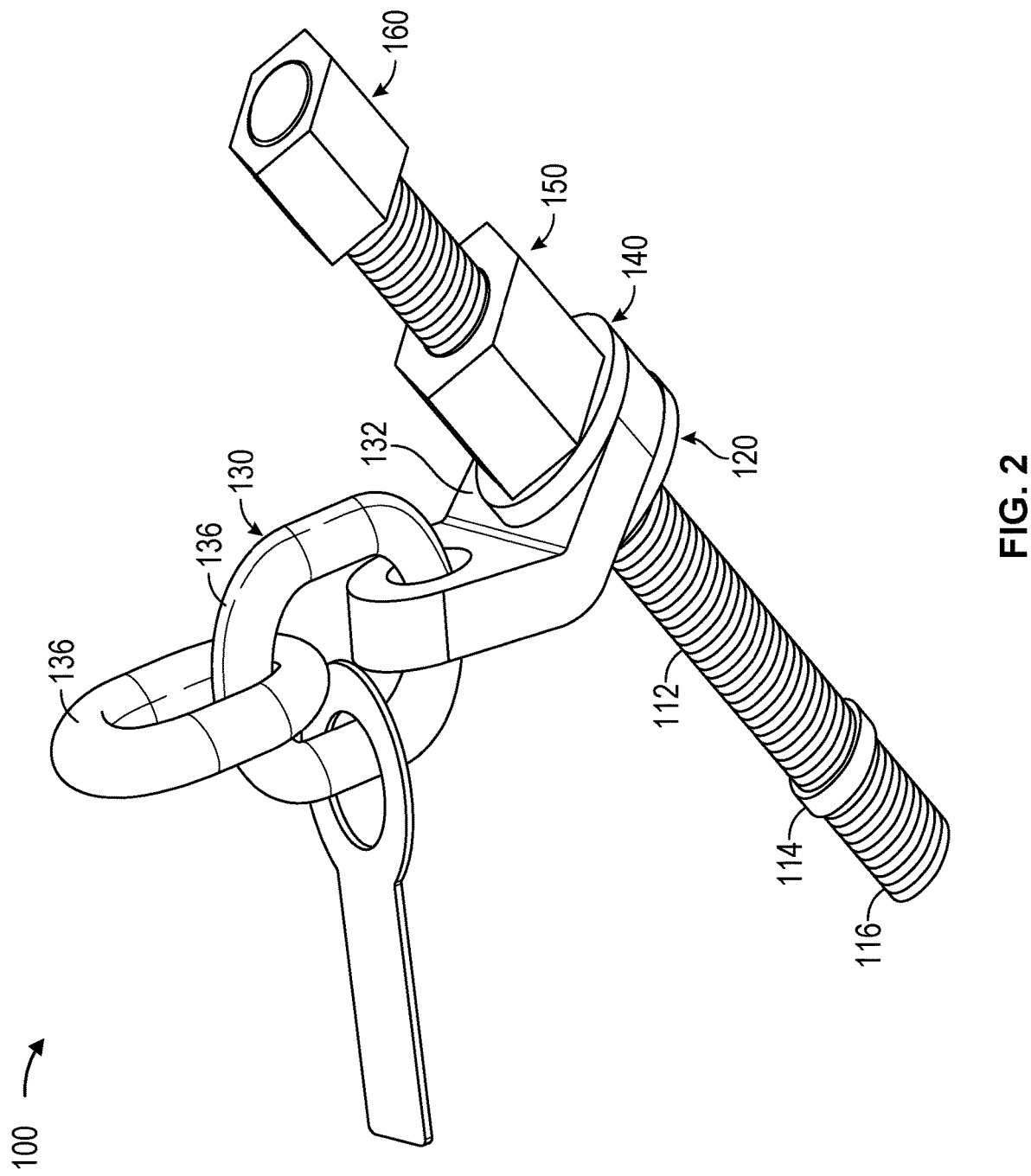
FIG. 2 is a diagram of an example perspective view of an adjustable length lifting bracket described herein.

FIG. 2 is a diagram of an example perspective view of adjustable length lifting bracket 100 described herein. The elements of adjustable length lifting bracket 100 have been described above with respect to FIG. 1. As shown in FIG. 2, bushing component 120 is threaded onto first threaded portion 112 of rod 110 (as explained above). Lifting bracket 130 is inserted over bushing portion 124 of bushing component 120 of rod 110 (as explained above). For example, receiving portion 132 (of lifting bracket 130) is inserted over bushing portion 124, of bushing component 120, via receiving hole 134. In some examples, lifting bracket 130 may be configured to swivel around rod 110. Additionally, or alternatively, lifting bracket 130 may configured to be locked into a horizontal position around rod 110. Washer 140 is provided over lifting bracket 130 (as explained above). In some examples, washer 140 may be inserted over bushing portion 124. First threaded component 150 is threaded onto first threaded portion 112 of rod 110 and inserted over interlocking nut portion 126 of bushing component 120 (as explained above). Second threaded component 160 is threaded onto first threaded portion 112 of rod 110 after first threaded component 150 is threaded onto first threaded portion 112.

As explained above, bushing component 120, lifting bracket 130, washer 140, and first threaded component 150 may form the lifting bracket assembly that may be threaded up or down first threaded portion 112 of rod 110 to adjust the position of lifting bracket 130 on rod 110. Non-threaded portion 114 may prevent movement of the lifting bracket assembly along second threaded portion 116. Second threaded component 160 may prevent the lifting bracket assembly from being removed from rod 110.

As indicated above, FIG. 2 is provided as an example. Other examples may differ from what was described in connection with FIG. 2.

Figure 3:
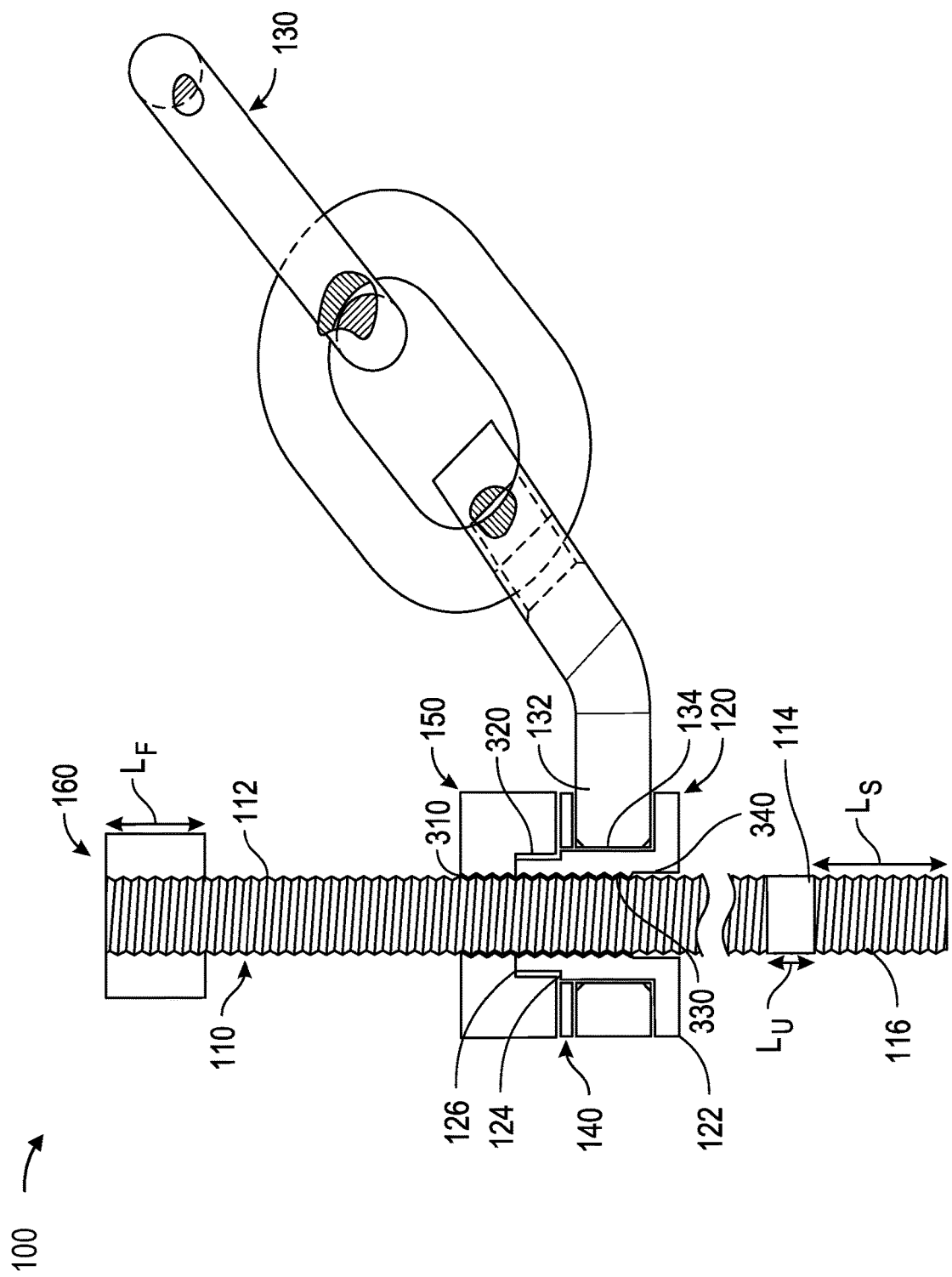
FIG. 3 is a diagram of an example cross-sectional view of adjustable length lifting bracket described herein.

FIG. 3 is a diagram of an example cross-sectional view of adjustable length lifting bracket 100 described in FIG. 2. The elements of adjustable length lifting bracket 100 have been described above with respect to FIG. 2.

As shown in FIG. 3, the internal surface of first threaded component 150 may include a nut threaded portion 310 (or threaded portion) and a nut non-threaded portion 320 (or non-threaded portion). Nut threaded portion 310 may be threaded onto first threaded portion 112 of rod 110. Nut non-threaded portion 320 may be inserted over interlocking nut portion 126 of bushing component 120. A shape of nut non-threaded portion 320 of first threaded component 150 may match the shape of the interlocking nut portion 126 of bushing component 120. In some examples, the shape of nut non-threaded portion 320 may be a circular shape. Alternatively, the shape of nut non-threaded portion 320 may be a square shape, a hexagonal shape, among other examples. As shown in FIG. 3, nut non-threaded portion 320 may be recessed with respect to a bottom surface of first threaded component 150.

As shown in FIG. 3, nut non-threaded portion 320 is shown as a slip/clearance fit over interlocking nut portion 126. Alternatively, nut non-threaded portion 320 may be provided to be a press fit over interlocking nut portion 126.

As shown in FIG. 3, the internal surface of bushing component 120 may include an internal bushing portion 330 and an internal bushing portion 340. Internal bushing portion 330 may be threaded onto first threaded portion 112 of rod 110. In some examples, an internal surface of bushing component 120 may be non-threaded (e.g., unthreaded). For instance, an entirety of the internal surface of bushing component 120 may be non-threaded (e.g., unthreaded). Internal bushing portion 340 is provided to allow clearance of bushing component 120 over non-threaded portion 114 of rod 110 in order to mount lifting bracket 130 flush (or substantially flush) to a surface of the component to be lifted, thereby properly securing lifting bracket 130 to the component.

In some examples, second threaded component 160 may be adjacent to first end 118 of first threaded portion 112 of rod 110. As shown in FIG. 3, a top surface of second threaded component 160 may be flushed (or substantially flushed) with respect to first end 118 of first threaded portion 112 of rod 110.

As shown in FIG. 3, non-threaded portion 114 may have a length Lu. In some implementations, Lu may be proportional to a diameter of rod 110. As an example, Lu may be half of the diameter of rod 110. Second threaded portion 116 may have a length Ls. In some implementations, Ls may be proportional to the diameter of rod 110. As an example, Ls may be one and a half times the diameter of rod 110. Second threaded component 160 may have a length LF. In some implementations, LF may be proportional to the diameter of rod 110. As an example, LF may be one and a half times the diameter of rod 110. The proportions of the different lengths with respect to the diameter of rod 110 are merely provided as an example. Other examples may differ from the example proportions provided herein.

As indicated above, FIG. 3 is provided as an example. Other examples may differ from what was described in connection with FIG. 3.

Figure 4:
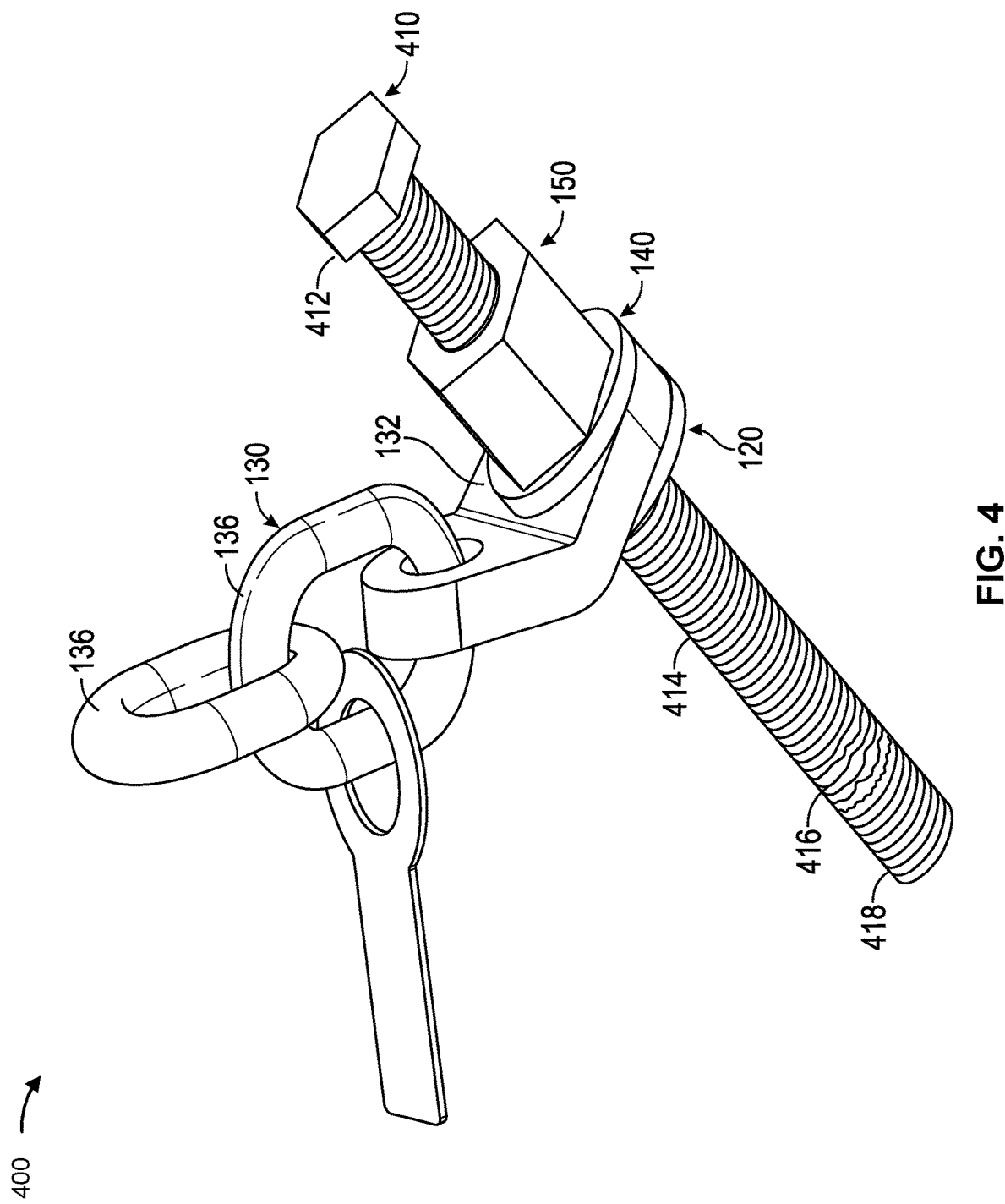
FIG. 4 is a diagram of an example perspective view of adjustable length lifting bracket described herein.

FIG. 4 is a diagram of an example perspective view of adjustable length lifting bracket 400 described herein. The elements of adjustable length lifting bracket 400 have been described above with respect to FIGS. 1-3. As shown in FIG. 4, adjustable length lifting bracket 400 may include a fastener 410 instead of rod 110 and second threaded component 160. Fastener 410 may include a fastener head 412, a first fastener threaded portion 414, a fastener altered threaded portion 416, and a second fastener threaded portion 418.

In some implementations, bushing component 120, lifting bracket 130, washer 140, and first threaded component 150 may be assembled to form the lifting bracket assembly (as described above in connection with FIGS. 1 and 2). The lifting bracket assembly may be threaded up fastener 410 from second fastener threaded portion 418 to first fastener threaded portion 414. Fastener head 412 may prevent the bracket assembly (described above) from being removed from fastener 410. A portion of thread of fastener 410 may be altered (e.g., peened, crimped, among other examples) to form an altered portion (e.g., fastener altered threaded portion 416) after the lifting bracket assembly has been threaded up to first fastener threaded portion 414. Fastener altered threaded portion 416 may prevent movement of the lifting bracket assembly to second fastener threaded portion 418. The lifting bracket assembly may be threaded up and down first fastener threaded portion 414, as explained above in connection with FIGS. 1-3.

As indicated above, FIG. 4 is provided as an example. Other examples may differ from what was described in connection with FIG. 4.

Figure 5:
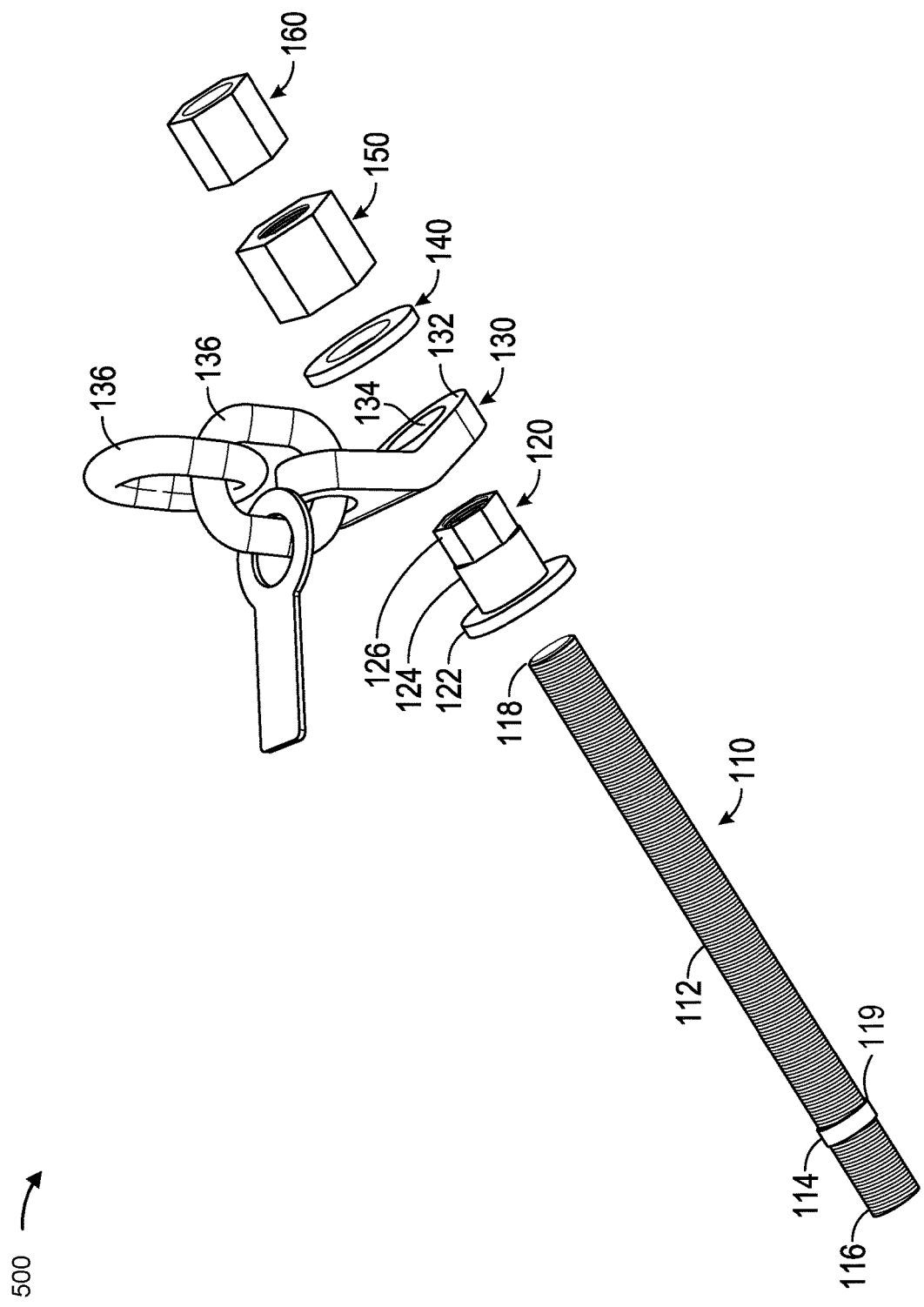
FIG. 5 is a diagram of an example exploded view of adjustable length lifting bracket described herein.

FIG. 5 is a diagram of an example exploded view of adjustable length lifting bracket 500 described herein. The elements of adjustable length lifting bracket 500 have been described above with respect to FIGS. 1-4. As shown in FIG. 5, a shape of interlocking nut portion 126 of bushing component 120 is a hexagonal shape.

First threaded component 150 may be fastened to bushing component 120 in various ways. Additionally, or alternatively, first threaded component 150 and bushing component 120 may be welded, brazed, or adhered together, among other examples.

As indicated above, FIG. 5 is provided as an example. Other examples may differ from what was described in connection with FIG. 5.

INDUSTRIAL APPLICABILITY

The present disclosure is directed to an adjustable length lifting bracket. In some implementations, the adjustable length lifting bracket comprises a threaded rod, a bushing, a lifting bracket, and a nut. A combination of the bushing and the nut enables a position of the lifting bracket to be adjusted on the threaded rod in order to mount a lifting link flush to a surface of a component that is being lifted. Adjusting the position of the lifting bracket causes the length of the threaded rod to be adjusted for use in different applications (as described above).

The lifting bracket may be secured (e.g., permanently secured) to the threaded rod by the combination of the bushing and the nut. The lifting bracket being secured to the threaded rod prevents the use of an incorrect fastener with the lifting bracket (e.g., because the threaded rod is designed to exact specifications, of a manufacturer, for the lifting bracket). By ensuring that the threaded rod is designed to the exact specifications for the lifting bracket, the adjustable length lifting bracket may prevent improper usage of the lifting bracket, may prevent the lifting bracket from being improperly secured to a component to be lifted, may prevent damage to the component being lifted, may prevent damage to the lifting bracket, among other examples. Additionally, the adjustable length lifting bracket, as described herein, saves resources (e.g., computing resources, energy resources, material resources, networking resources, among other examples) that would be needed to produce various non-adjustable length lifting brackets for different types of applications, to use various non-adjustable length lifting brackets for different types of applications, among other examples.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An adjustable length lifting bracket assembly, comprising:
   a threaded rod;
   a bushing configured to be inserted over the threaded rod;
   a lifting bracket comprising a receiving portion that includes a receiving hole,
      wherein the receiving portion is configured to be inserted over the bushing via the receiving hole; and
   an adjusting nut comprising an internal surface that comprises a threaded portion and a non-threaded portion, wherein the threaded portion is configured to be threaded onto the threaded rod and the non-threaded portion is configured to be inserted over the bushing, and wherein the adjusting nut is configured to be threaded up and down the threaded rod, with the bushing, to adjust a position of the lifting bracket on the threaded rod.

2. The adjustable length lifting bracket assembly of claim 1, wherein the threaded rod comprises a first portion, a second portion, and a third portion between the first portion and the second portion, wherein the first portion and the second portion are threaded, and wherein the third portion is not threaded.

3. The adjustable length lifting bracket assembly of claim 2, wherein the third portion prevents the bushing and the lifting bracket from being threaded past the first portion.

4. The adjustable length lifting bracket assembly of claim 1, further comprising an installation nut, wherein the installation nut is configured to be threaded onto a portion of the threaded rod.

5. The adjustable length lifting bracket assembly of claim 1, wherein the bushing comprises an interlocking nut portion, and wherein the non-threaded portion, of the adjusting nut, is configured to be inserted over the interlocking nut portion of the bushing.

6. The adjustable length lifting bracket assembly of claim 5, wherein a shape of the non-threaded portion of the adjusting nut matches a shape of the interlocking nut portion of the bushing.

7. The adjustable length lifting bracket assembly of claim 6, wherein a shape of the interlocking nut portion of the bushing is a circular shape or a hexagonal shape.

8. A lifting component, comprising:
a rod comprising a threaded portion;
a bushing configured to be inserted onto the threaded portion;
a lifting bracket comprising a receiving portion that includes a receiving hole,
wherein the receiving portion is configured to be inserted over the bushing, via the receiving hole; and
an adjusting nut,
wherein the adjusting nut is configured to be threaded onto the threaded portion and is configured to be provided over a portion of the bushing,
wherein the adjusting nut is configured to be threaded up and down the threaded portion, with the bushing, to adjust a position of the lifting bracket on the rod,
wherein a non-threaded portion of an internal surface of the adjusting nut is configured to be inserted over the portion of the bushing, and
wherein a shape of the non-threaded portion matches a shape of the portion of the bushing.

9. The lifting component of claim 8, further comprising a washer, wherein the washer is configured to be provided between a top surface of the receiving portion of the lifting bracket and a bottom surface of the adjusting nut.

10. The lifting component of claim 8, wherein a shape of the portion, of the bushing, is a circular shape, and wherein the adjusting nut is a hexagonal nut.

11. The lifting component of claim 8, wherein the threaded portion is a first threaded portion, wherein the rod further comprises a second threaded portion and a third portion between the first threaded portion and the second threaded portion, and wherein the third portion prevents movement of the bushing, the lifting bracket, and the adjusting nut along the second threaded portion.

12. The lifting component of claim 8, further comprising an installation nut, wherein the installation nut is configured to be threaded onto an end of the threaded portion of the rod.

13. The lifting component of claim 8, wherein the rod is part of a fastener, wherein the threaded portion is a first threaded portion, and wherein the rod further comprises a second threaded portion and an altered portion between the first threaded portion and the second threaded portion.

14. The lifting component of claim 8, wherein a shape of the portion, of the bushing, is an hexagonal shape.

15. A lifting system comprising:
a rod comprising a threaded portion; and
a lifting bracket assembly configured to be moved up and down the threaded portion,
wherein the lifting bracket assembly comprises:
a bushing component,
a lifting bracket comprising a receiving portion that includes a receiving hole,
wherein the receiving portion is configured to be inserted over the bushing component via the receiving hole,
wherein a threaded component is configured to be inserted over the bushing component,
wherein an internal surface of the bushing component is threaded,
wherein a first portion of an internal surface of the threaded component is threaded, and
wherein a second portion of the internal surface of the threaded component is not threaded.

16. The lifting system of claim 15, wherein the threaded portion is a first threaded portion, wherein the rod further comprises a second threaded portion and a non-threaded portion between the first threaded portion and the second threaded portion, and wherein the non-threaded portion prevents movement of the lifting bracket assembly along the second threaded portion.

17. The lifting system of claim 15, wherein a shape of a portion, of an external surface of the bushing component, matches a shape of the second portion of the internal surface of the threaded component, and wherein the second portion is inserted over the portion of the external surface of the bushing component.

18. The lifting system of claim 15, wherein the threaded portion is a first threaded portion, wherein the rod further comprises a second threaded portion and a third portion between the first threaded portion and the second threaded portion, and wherein the third portion prevents movement of the lifting bracket assembly along the second threaded portion.

\* \* \* \* \*